W. S. MOCK.
ELECTRIC RAT TRAP.
APPLICATION FILED APR. 16, 1912.
1,045,584.
Patented Nov. 26, 1912.
2 SHEETS—SHEET 1.
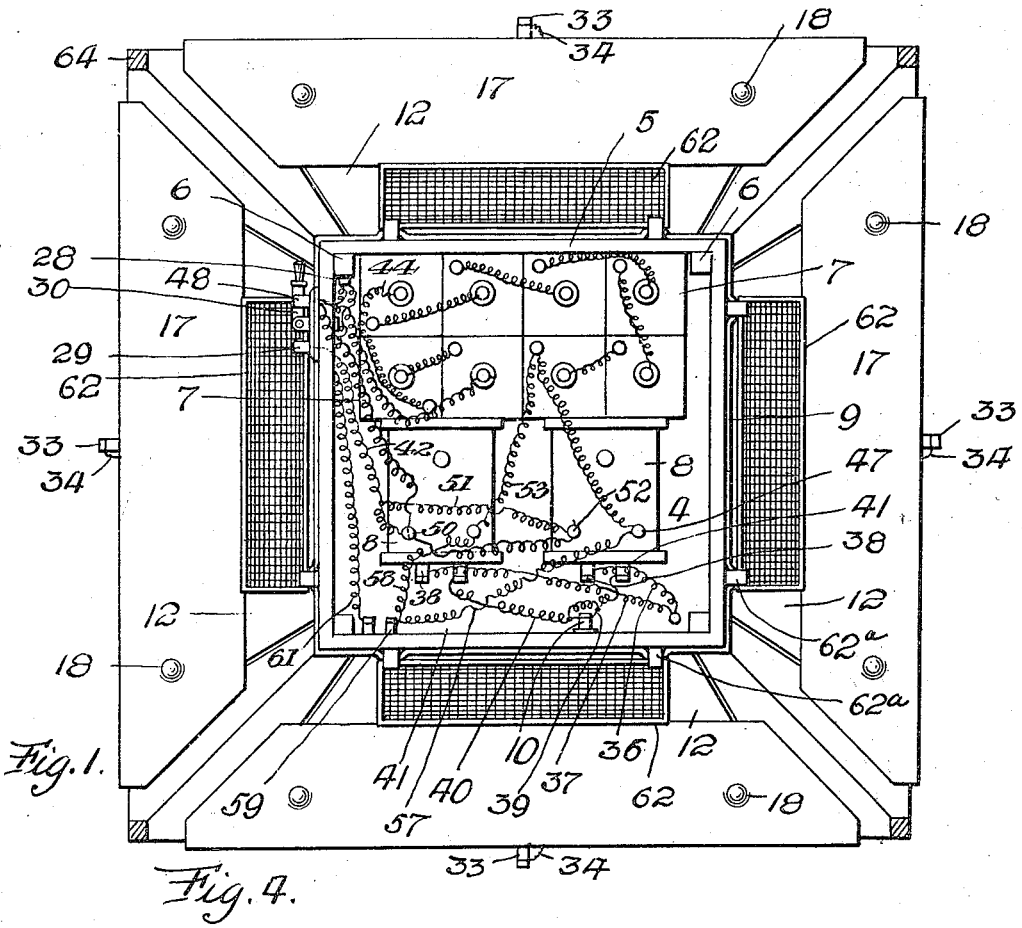
Fig. 1.
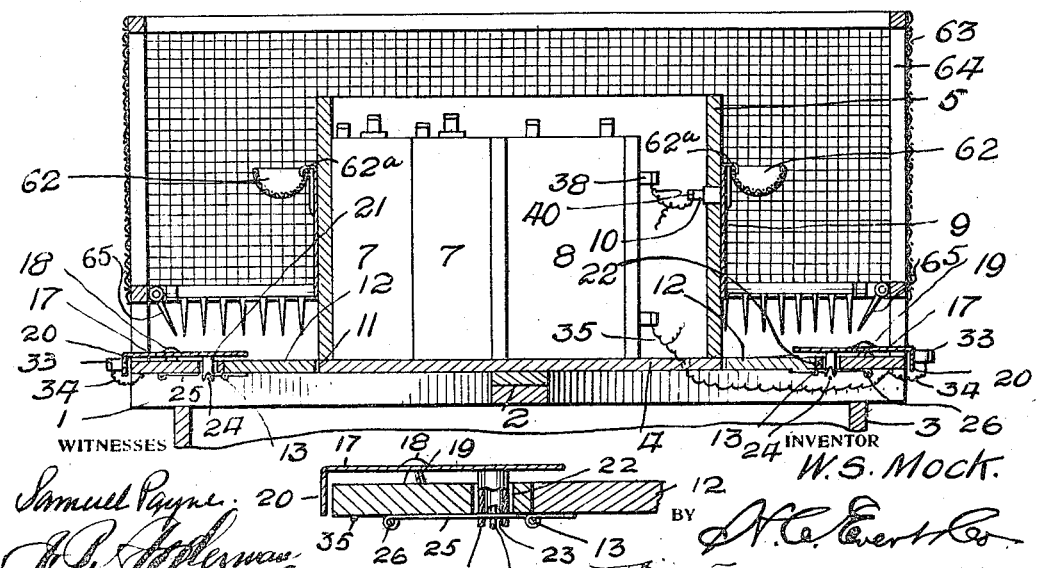
Fig. 4.
Fig. 5.
WITNESSES
Samuel Payne
J. P. Afferman
INVENTOR
W. S. Mock
BY
N. C. Everts
ATTORNEYS W. S. MOCK.
ELECTRIC RAT TRAP.
APPLICATION FILED APR. 16, 1912.
1,045,584.
Patented Nov. 26, 1912.
2 SHEETS—SHEET 2.
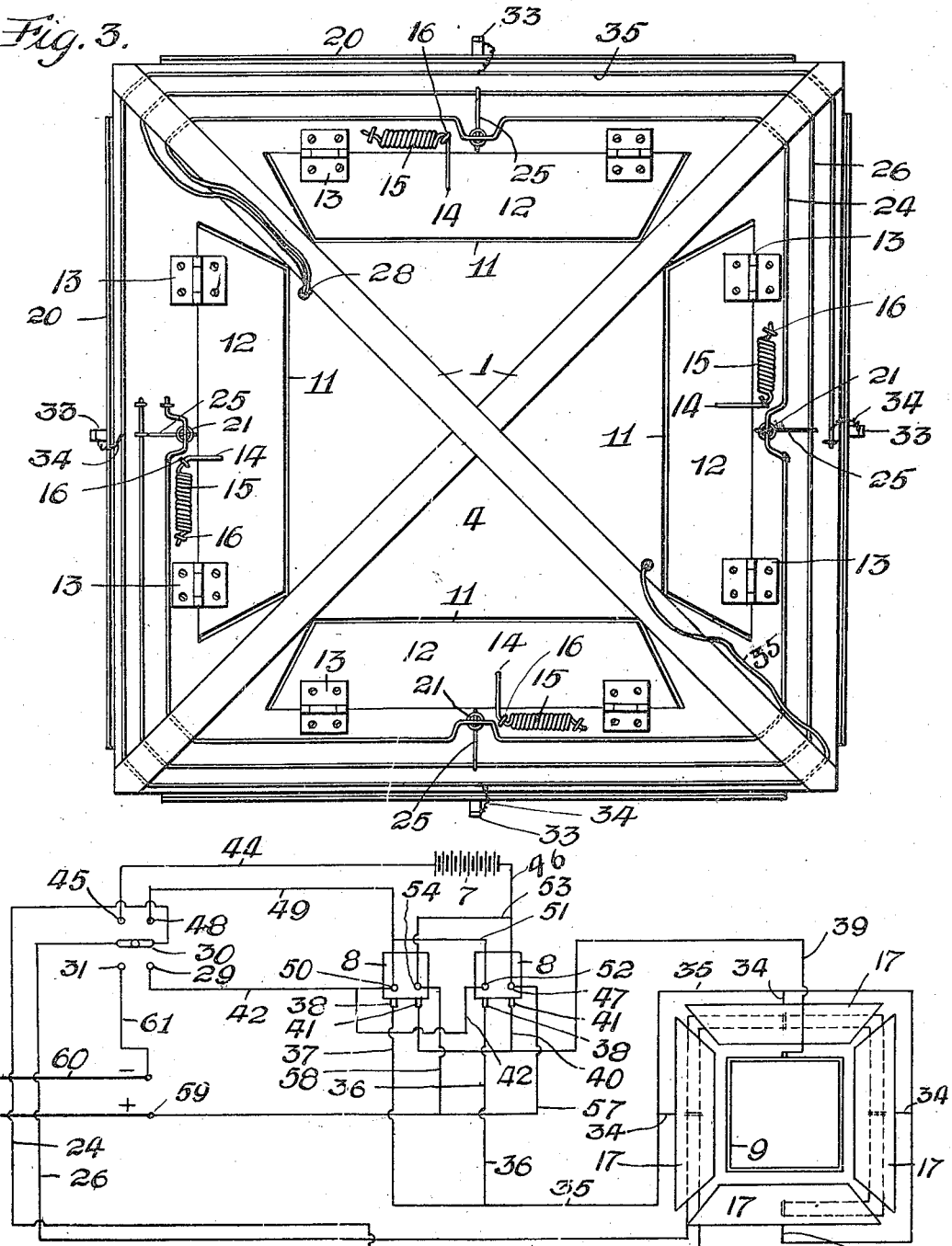
WITNESSES
INVENTOR
W. S. Mock
BY 
ATTORNEYS.

UNITED STATES PATENT OFFICE.

WINFIELD S. MOCK, OF EDGEWOOD, PENNSYLVANIA, ASSIGNOR OF ONE-HALF TO ROBERT A. ROBINSON, OF SWISSVALE, PENNSYLVANIA.

ELECTRIC RAT-TRAP.

1,045,584.　　　　Specification of Letters Patent.　　Patented Nov. 26, 1912.

Application filed April 16, 1912. Serial No. 691,208.

*To all whom it may concern:*

Be it known that I, WINFIELD S. MOCK, a citizen of the United States of America, residing at Edgewood, in the county of Allegheny and State of Pennsylvania, have invented certain new and useful Improvements in an Electric Rat-Trap, of which the following is a specification, reference being had therein to the accompanying drawing.

This invention relates to electric rat traps, and the objects of my invention are to provide a trap wherein electricity is employed for exterminating the lives of rats or other rodents that enter the trap, and to provide a trap that can be safely used in large buildings without any danger of cats, dogs or persons being injured by the trap.

Further objects of my invention are to provide a trap that can be used in connection with an ordinary electric lighting system or with a special source of electrical energy located within the trap, and to provide a trap of the above type that is inexpensive to maintain, durable and highly efficient for the purposes for which it is intended.

With the above and other objects in view the invention resides in the novel construction, combination and arrangement of parts to be hereinafter specifically described and then claimed.

Reference will now be had to the drawings wherein like numerals denote corresponding parts throughout the several views, in which:—

Figure 1 is a plan of the trap with the cage thereof removed, Fig. 2 is a diagrammatic view of the electrical connections for the trap, Fig. 3 is a bottom plan of the trap, Fig. 4 is a cross sectional view of the trap, and Fig. 5 is an enlarged detailed sectional view of one of the tiltable platforms of the trap.

An electric rat trap in accordance with this invention comprises diagonally disposed cross bars 1, said bars being cut away intermediate the ends thereof, as at 2 whereby the bars can be fitted together to remain in a common plane. The bars are adapted to be supported upon the upper edges of a tank 3 or other receptacle, said receptacle being used to collect the bodies of electrocuted rodents.

The bars 1 support a rectangular base plate 4 and mounted upon said base plate is a central rectangular housing 5 having the upper end thereof open and the walls of said housing braced by corner posts 6. The housing 5 constitutes a compartment for batteries 7 and induction coils 8, said batteries being arranged in series. The batteries 7 and induction coils 8 represent a suitable source of electrical energy that can be used where buildings or wharves are not equipped with an electric lighting system.

The outer sides of the rectangular housing 5 are provided with metallic contact plates 9 arranged intermediate the upper and lower edges of the walls of the housing. The contact plates 9 have the ends thereof contacting at the ends of the walls of the housing and one of the contact plates 9 is provided with a binding post 10 that extends through the walls of the housing, said binding post being connected to the induction coils 8, as will hereinafter appear.

The base plate 4 is provided with a series of oblong openings 11 and in these openings are arranged trap doors 12, said doors being hinged, as at 13 to swing downwardly. The doors are supported normally in a horizontal or closed position by the ends 14 of coiled springs 15 secured, as at 16 to the under side of the base plate 4, adjacent to the openings 11. The trap doors 12 are adjacent to the walls of the housing 5 and correspond in number to the walls of said housing.

That portion of the base plate 4, between the outer edge thereof and the hinged edges of the trap doors 12 is provided with tiltable metallic platforms 17. The platforms 17 are formed with depressed portions 18 providing sockets for bearings 19, carried by the base plate 4. The bearings 19 tiltably support the platforms 17, and the outer edges of said platforms are provided with depending portions 20 that extend downwardly over the outer edges of the base plate 4. The tiltable metallic platforms are provided with depending tubular posts 21, preferably made of an insulating material, as fiber or rubber. The posts 21 extend through openings 22 provided therefor in the base plate 4 and the lower ends of the posts are provided with oppositely disposed V-shaped notches 23 providing clearance for a wire 24 that is secured to the under side of the base plate 4. Extending through the lower ends of the posts 21 and adapted to contact with the wire 24 are branch wires 25, carried by a main wire 26 suitably secured to the under side of the base plate 4. The branch wires 25 serve as springs for maintaining the tiltable platforms 17 in a normally horizontal position, yet permitting of the platforms to tilt by the weight of a rodent's body, to place the branch wires in engagement with the wire 24.

The wires 24 and 26 pass through grooves 27 provided therefor in the bars 1 and upwardly through an opening 28 provided therefor in the base plate 4. The wires 24 and 26 are connected to the central positions of a double-throw switch 30, arranged upon the wall of the housing 5, which switch provides a connection from its central post to the contacts 31 and 29 separately.

The outer edges of the tiltable platforms 17 are provided with posts 33 and connected to said posts are the branch wires 34 of a main wire 35 that is carried by the bottom side of the base plate 4, said wire extending through the bars 1, similar to the wires 24 and 26. The wire 35 is connected by branches 36 and 37 to the binding post 38 of the induction coils 8.

The other electrical connections are as follows; the contact plates 9 are connected by wires 39 and 40 to the binding post 41 of the induction coils 8. The induction coils are connected by wires 42 to the contact 29 of the switch 30. The batteries are in series and are connected by a wire 44 to the contact 45 of the switch 31 and by a wire 46 to the binding post 47 of one of the induction coils.

The contact 48 of the switch 30 is connected by a wire 49 to the binding post 50 of the other induction coil. The wire 49 is connected by a wire 51 to the post 52 of the other induction coil and the wire 46 is connected by a wire 53 to the post 54 of the other induction coil.

The binding posts 47 and 54 are connected by wires 57 and 58 to the positive side 59 of a main line and the negative side 60 of said line is connected by a wire 61 to the contact 31.

Without describing the various circuits, it is thought that the operation of the trap will be understood from the following:— When the double throw switch 30 is thrown to the contacts 45 and 48, the batteries can be utilized for electrocuting a rodent, and when the switch is thrown to the contacts 29 and 31, the main lines 59 and 60 can be used.

When a rodent treads upon one of the tiltable platforms 17 the wires 24 and 26 are connected, immediately placing the batteries 7 in circuit with the induction coils 8 charging the plates 9 as well as the housing 5, and upon a rodent placing the fore feet against the contact plate 9, the rodent's body receives the full charge of electricity and drops through one of the trap doors 12 into the tank 3. By using the induction coils or transformers, the ordinary electric lighting circuit of 110 volts can be raised to 800 volts or more, thereby insuring electrocution of the animal body that receives such voltage.

Supported upon the upper edges of the contact 9 by the hooks 62$^a$ are holders 62 for suitable bait employed for enticing a rodent into the trap. The bait holders are of metal that will be charged with electricity when the circuit is formed.

To prevent cats, dogs and even persons from being injured by the trap, a rectangular cage 63 is supported by the base plate 4, said cage being mounted upon legs 64 to provide sufficient clearance for a rodent's body in passing into the trap. The cage is made of a frame work covered with interwoven wire, and at the lower edges of said cage are yieldable prongs 65 that can be raised by a rodent's body entering the trap, said prongs preventing the escaping of a rodent after having passed onto the trap doors 12.

From the foregoing it will be observed that I have devised a trap that can be used in connection with a suitable source of electrical energy, said trap including means for maintaining a primary open circuit adapted to be closed to establish a secondary open circuit that is completed or closed by a rodent's body within the trap. Provision is also made for collecting the bodies in a suitable receptacle whereby the bodies will not interfere with the operation of the trap or alarm other rodents to that extent that they would not enter the trap. The cage 63 is so positioned with respect to the platform 17 that the rodent will naturally make an effort to grab the bait before it passes upon the trap door 12, in case that the rodent does not spring for the bait and engage the contact plate 9, but passes directly upon the trap door 12, the rodent will be precipitated into the receptacle 3. The latter containing water and under such circumstances the rodent will be drowned.

What I claim is:—

1. In an electric rat trap, the combination with a suitable source of electrical energy, of a base plate, a housing carried thereby, induction coils arranged within said housing and in circuit with said source of electrical energy, tiltable platforms arranged upon said base plate and normally maintaining an open primary circuit in connection with said source of electrical energy, means actuated by a tilting movement of said platforms to close said primary circuit and establish an open secondary circuit in connection with said source of electrical energy and said induction coils, contact plates carried by the walls of said housing and in circuit with one side of said open secondary circuit, said platforms being connected to the other side of the secondary circuit, a receptacle supporting said base plate, and normally closed trap doors carried by said base plate above said receptacle.

2. In an electric rat trap, the combination with a suitable source of electrical energy, of a base plate, a housing carried thereby, induction coils arranged within said housing and in circuit with said source of electrical energy, tiltable platforms arranged upon said base plate and normally maintaining an open primary circuit in connection with said source of electrical energy, means actuated by a tilting movement of said platforms to close said primary circuit and establish an open secondary circuit in connection with said source of electrical energy and said induction coils, contact plates carried by the walls of said housing and in circuit with one side of said open secondary circuit, said platforms being connected to the other side of the secondary circuit, a receptacle supporting said base plate, normally closed trap doors carried by said base plate above said receptacle, bait holders supported upon the upper edges of said contact plates, and a foraminous cage arranged over said housing and supported by said base plate, said cage spaced from said platforms to allow the entrance of a rodent to the trap.

In testimony whereof I affix my signature in the presence of two witnesses.

WINFIELD S. MOCK.

Witnesses:
ROBERT A. ROBINSON,
MAX H. SROLOVITZ.

---

Copies of this patent may be obtained for five cents each, by addressing the "Commissioner of Patents, Washington, D. C."